United States Patent
Bowen et al.

(10) Patent No.: US 6,464,608 B2
(45) Date of Patent: Oct. 15, 2002

(54) TRANSFER CASE FOR HYBRID VEHICLE

(75) Inventors: Thomas C. Bowen, Rochester Hills, MI (US); Sankar K. Mohan, DeWitt, NY (US)

(73) Assignee: New Venture Gear Inc., Troy, MI (US)

( * ) Notice: Subject to any disclaimer, the term of this patent is extended or adjusted under 35 U.S.C. 154(b) by 11 days.

(21) Appl. No.: 09/779,801

(22) Filed: Feb. 8, 2001

(65) Prior Publication Data

US 2002/0107101 A1 Aug. 8, 2002

(51) Int. Cl.[7] ............................. F16H 3/72; F16H 37/06
(52) U.S. Cl. ............................. 475/5; 475/4; 180/242; 180/65.2; 180/65.3
(58) Field of Search .............................. 475/4, 5; 477/4, 477/9; 180/242, 244, 65.2, 65.3

(56) References Cited

U.S. PATENT DOCUMENTS

| | | | | |
|---|---|---|---|---|
| 5,700,222 A | * | 12/1997 | Bowen | 475/5 |
| 5,713,425 A | * | 2/1998 | Buschhaus et al. | 180/65.2 |
| 6,041,877 A | * | 3/2000 | Yamada et al. | 180/65.2 |
| 6,048,289 A | * | 4/2000 | Hattori et al. | 477/15 |
| 6,059,064 A | * | 5/2000 | Nagano et al. | 180/243 |
| 6,083,138 A | * | 7/2000 | Aoyama et al. | 477/5 |
| 6,083,139 A | * | 7/2000 | Deguchi et al. | 477/5 |
| 6,098,733 A | * | 8/2000 | Ibaraki et al. | 180/65.2 |
| 6,110,066 A | * | 8/2000 | Nedungadi et al. | 475/5 |
| 6,116,363 A | * | 9/2000 | Frank | 180/65.2 |
| 6,146,302 A | * | 11/2000 | Kashiwase | 475/5 |
| 6,321,865 B1 | * | 11/2001 | Kuribayashi et al. | 180/243 |
| 6,371,878 B1 | * | 4/2002 | Bowen | 475/5 |
| 2001/0016532 A1 | * | 8/2001 | Jung | 475/5 |
| 2001/0019980 A1 | * | 9/2001 | Kanehisa | 475/5 |

* cited by examiner

*Primary Examiner*—Sherry Estremsky
*Assistant Examiner*—Tisha D. Lewis
(74) *Attorney, Agent, or Firm*—Harness, Dickey & Pierce P.L.C.

(57) ABSTRACT

A hybrid drive system for a four-wheel drive system arranged to supply motive power to a transfer case from an internal combustion engine and/or an electric motor/generator. The transfer case is comprised of a planetary gearset having a first input driven by the motor/generator, a second input driven by the engine, and an output directing drive torque to the front and rear drivelines. The output of the planetary gearset drives a rear output shaft connected to the rear driveline and further drives a front output shaft connected to the front driveline. The transfer case further includes a second planetary gearset having an input driven by the motor/generator and an output driving the first input of the first planetary gearset. This hybrid drive arrangement permits use of a modified transfer case in place of a conventional transfer case in a traditional four-wheel drive driveline.

40 Claims, 3 Drawing Sheets

TRANSFER CASE FOR HYBRID VEHICLE

FIELD OF THE INVENTION

The present invention relates to hybrid drive systems for motor vehicles. More specifically, the present invention relates to a transfer case for use in four-wheel drive hybrid vehicles.

BACKGROUND OF THE INVENTION

Automobile manufacturers are actively working to develop alternative powertrain systems in an effort to reduce the level of pollutants exhausted into the air by conventional powertrains equipped with internal combustion engines. Significant development has been directed to electric vehicles and fuel cell vehicles. Unfortunately, these alternative powertrain systems suffer from several disadvantages and, for all practical purposes, are still under development. However, several different hybrid electric vehicles (HEV) have recently been offered for sale. These hybrid vehicles are equipped with an internal combustion engine and an electric motor that can be operated independently or in combination to drive the vehicle.

There are two types of hybrid vehicles, namely, series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles utilizes a low-load mode where only the electric motor is used to drive the vehicle, a high-load mode where only the engine is used to drive the vehicle, and an intermediate assist mode where the engine and electric motor are both used to drive the vehicle. Regardless of the type of hybrid drive system used, hybrid vehicles are highly modified versions of conventional vehicles that are expensive due to the componentry, required control systems, and specialized packaging requirements.

Hybrid vehicles have also been adapted to four-wheel drive vehicles and typically utilize the above-noted parallel hybrid powertrain to drive the primary wheels and a second electric motor to drive the secondary wheels. Obviously, such a four-wheel drive system is not only extremely expensive and difficult to package, but is also difficult to control in view of the need to react to instantaneous instances of wheel slip. Thus, a need exists to develop hybrid powertrains for use in four-wheel drive vehicles that utilize many conventional powertrain components so as to minimize specialized packaging and reduce cost.

SUMMARY OF THE INVENTION

It is therefore an object of the present invention to provide a hybrid powertrain or drive system for a four-wheel drive vehicle.

In accordance with another object, the four-wheel drive hybrid drive system of the present invention includes a transfer case adapted for conventional connection between the transmission and the front and rear drivelines of the motor vehicle.

According to another object, the four-wheel drive hybrid drive system is a parallel-type system with an input clutch and an electric motor/generator integrated into the transfer case.

As a related object, the hybrid drive system of the present invention permits use of the internal combustion engine and the electric motor/generator separately or in combination as power sources for driving the motor vehicle.

These and other objects are provided by a transfer case comprised of a planetary gearset having a first input driven by the motor/generator, a second input driven by the transmission, and an output directing drive torque to the front and rear drivelines. The output of the planetary gearset drives a rear output shaft connected to the rear driveline and further drives a front output shaft connected to the front driveline. The transfer case further includes a second planetary gearset having an input driven by the motor/generator and an output driving the first input of the first planetary gearset.

Further areas of applicability of the present invention will become apparent from the detailed description provided hereinafter. It should be understood that the detailed description and specific examples, while indicating preferred embodiments of the present invention, are intended for purposes of illustration only since various changes and modifications within the scope of this particular invention will become apparent to those skilled in the art.

DETAILED DESCRIPTION OF THE PREFERRED EMBODIMENT

Figure 1:
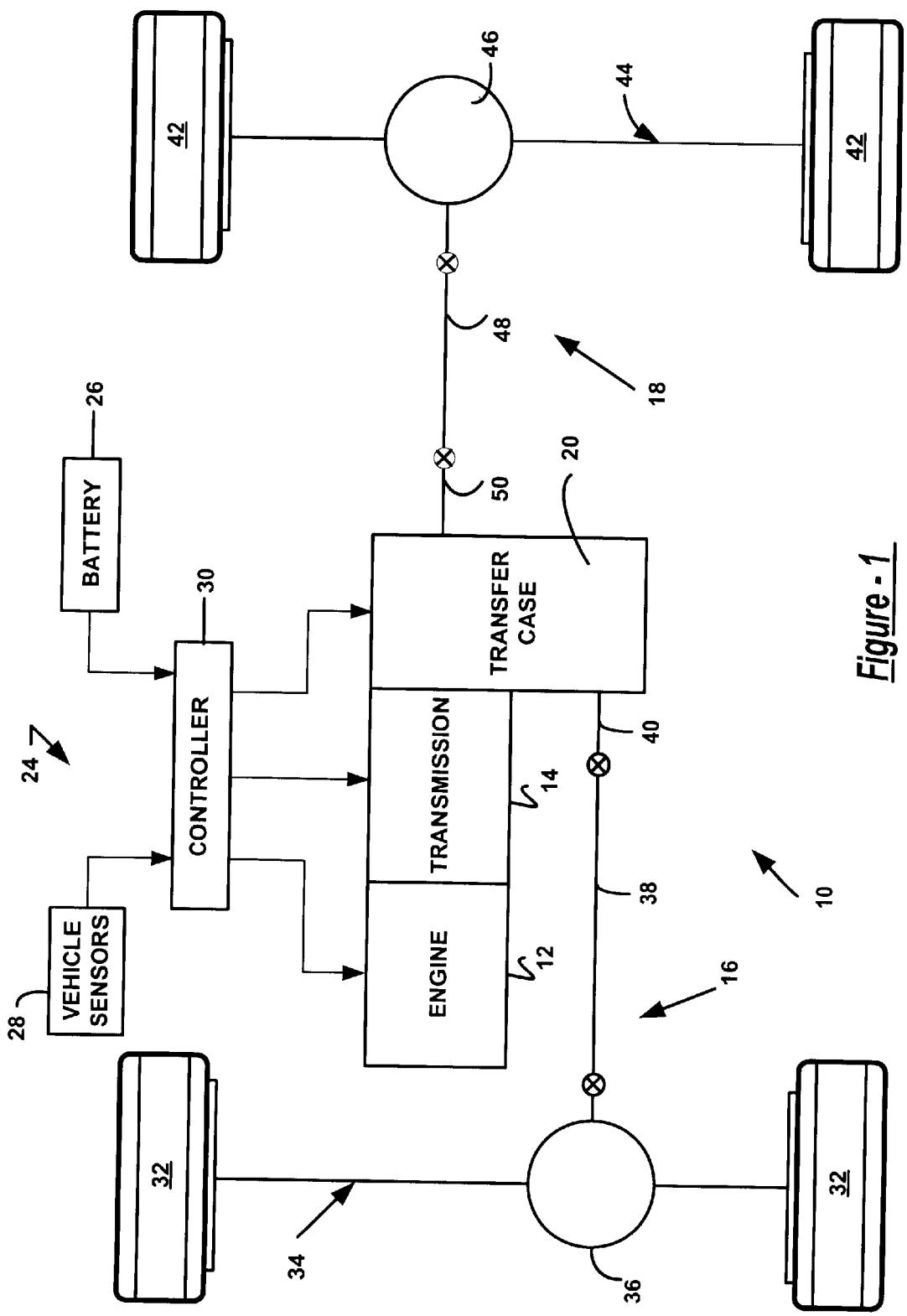
FIG. 1 is a schematic view showing a hybrid powertrain for a four-wheel drive vehicle in accordance with the present invention.

Referring to the drawings, FIG. 1, a four-wheel drive powertrain for a hybrid motor vehicle 10 is shown to include an internal combustion engine 12, a transmission 14, a front driveline 16, a rear driveline 18, a transfer case 20, and an electric motor/generator 22. Vehicle 10 further includes a powertrain control system 24 generally shown to include a battery 26, a group of vehicle sensors 28, and a controller 30. Front driveline 16 includes a pair of front wheels 32 connected to a front axle assembly 34 having a front differential unit 36 connected to one end of a front prop shaft 38, the opposite end of which is connected to a front output shaft 40 of transfer case 20. Similarly, rear driveline 18 includes a pair of rear wheel 42 connected to a rear axle assembly 44 having a rear differential unit 46 connected to one end of a rear prop shaft 48, the opposite end of which is connected to a rear output shaft 50 of transfer case 20.

Figure 2:
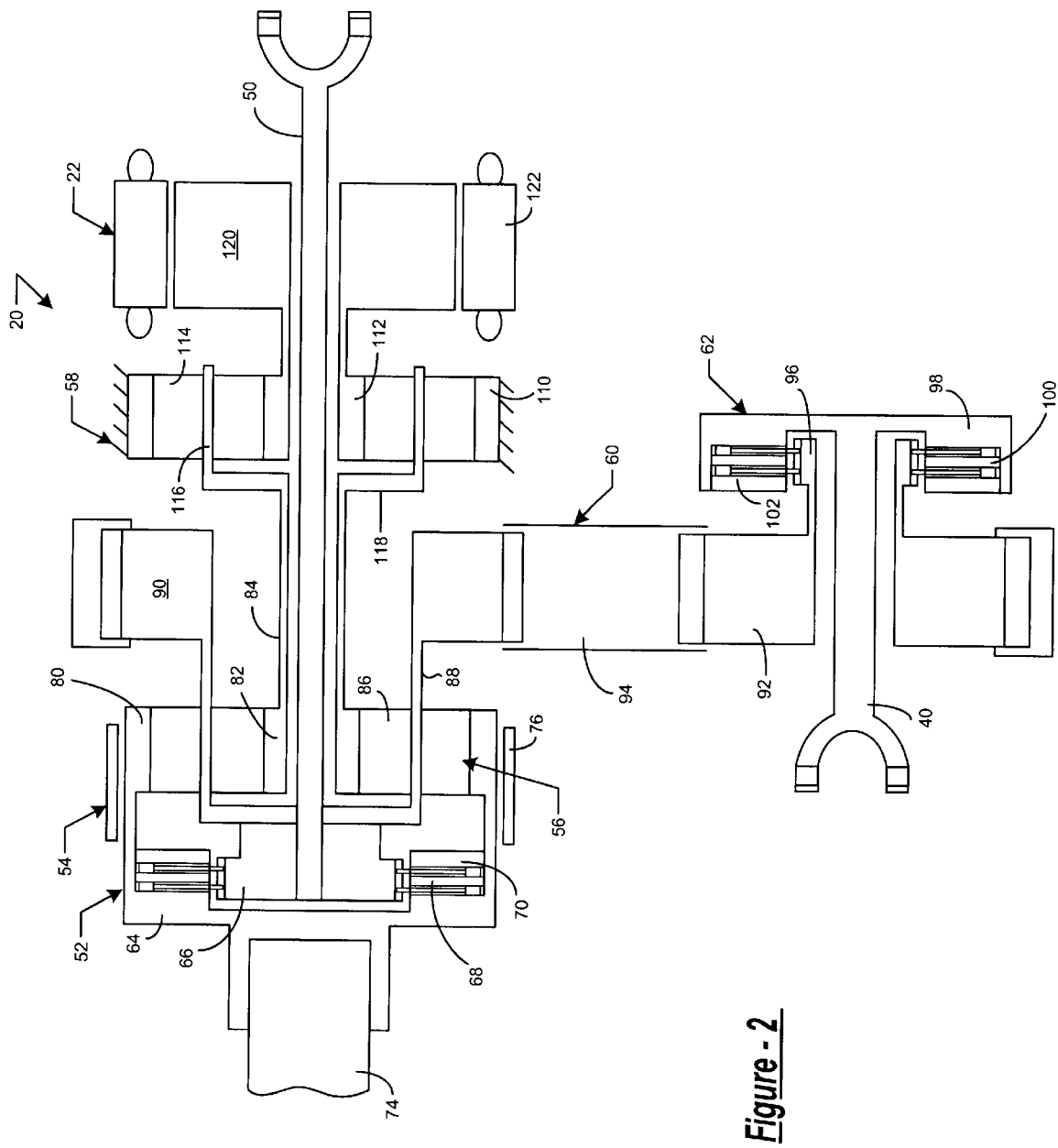
FIG. 2 is a sectional view of the transfer case associated with the hybrid powertrain of FIG. 1.

Referring primarily to FIG. 2, the components of transfer case 20 are shown in greater detail. In general, transfer case 20 includes an input clutch 52, an input brake 54, a front planetary gearset 56, a rear planetary gearset 58, motor/generator 22, a transfer unit 60, and a transfer clutch 62. In general, input clutch 52 is a spring-apply, pressure-release type of clutch and is shown to include a clutch drum 64, a drive hub 66 fixed to rear output shaft 50, a clutch pack 68 interconnected between clutch drum 64 and drive hub 66, and a spring-biased apply plate 70. Input clutch 52 further includes a power-operated clutch actuator 72 (FIG. 3) which is controlled by controller 30 for selectively moving apply plate 70 to vary the clutch engagement force exerted on clutch pack 68 for shifting input clutch 52 between an engaged mode and a released mode. Clutch drum 64 is fixed to an output shaft 74 of transmission 14 such that when input clutch 52 is engaged, drive hub 66 is driven by engine 12 and transmission 14. In contrast, drive hub 66 is free to rotate relative to drum 64 when input clutch 52 is released. While input clutch 52 is shown to be a multi-plate type clutch it is noted that a single-plate type clutch or a powder type electromagnetic clutch may also be used. Control of the torque transmission across input clutch 52 is adaptively controlled to provide smooth clutch engagement.

Input brake 54 is shown to include a brake band 76 surrounding the outer peripheral surface of clutch drum 64. Brake 54 further includes a power-operated brake actuator 78 (FIG. 3) which is controlled by controller 30 for moving band 76 between a displaced position and an engaged position relative to drum 64. With band 76 in its displaced position, drum 64 is free to rotate so as to define a released mode for brake 54. In contrast, movement of band 76 to its engaged position acts to brake drum 64 against rotation and define an engaged mode for brake 54.

Front planetary gearset 56 includes a ring gear 80 fixed to clutch drum 64, a sun gear 82 fixed to a quill shaft 84, and pinion gears 86 meshed with ring gear 80 and sun gear 82. Pinion gears 86 are rotatably supported on a pinion carrier 88 that is fixed for rotation with drive hub 66 and/or rear output shaft 50. Rear output shaft 50 rotatably supports quill shaft 84 thereon. A drive sprocket 90 associated with transfer unit 60 is fixed to pinion carrier 88. Transfer unit 60 also includes a driven sprocket 92 rotatably supported on front output shaft 40, and a power chain 94 meshed with sprockets 90 and 92. Based on this arrangement, drive sprocket 90 is commonly driven with rear output shaft 50.

Transfer clutch 62 is operable to selectively couple driven sprocket 92 to front output shaft 40. Transfer clutch 62 includes a hub 96 fixed for rotation with driven sprocket 92, a clutch drum 98 fixed for rotation with front output shaft 40, a clutch pack 100 interconnected between hub 96 and drum 98, and an apply plate 102. A power-operated clutch actuator 104 (FIG. 3) is controlled by controller 30 and is operable to selectively move apply plate 102 for exerting a clutch engagement force on clutch pack 100. Preferably, clutch actuator 104 is capable of modulated or progressive control such that the amount of drive torque transferred to front output shaft 40 can be automatically varied. A mode selector 106 under the control of the vehicle operator supplies a mode signal to controller 30 indicating a desire to establish one of a two-wheel drive mode (2WD), a part-time four-wheel drive mode (4WD-LOCK), or an on-demand four-wheel drive mode (4WD-AUTO). In the 2WD mode, transfer clutch 62 is fully released such that no drive torque is transferred through transfer unit 60 to front output shaft 40. In the 4WD-LOCK mode, transfer clutch 62 is fully engaged such that front output shaft 40 is rigidly coupled for rotation with rear output shaft 50. Finally, in the 4WD-AUTO mode, the torque distributed between rear output shaft 50 and front output shaft 40 is variably adjusted as a function of specific operating characteristics such, as, for example, the speed differential between front prop shaft 38 and rear prop shaft 48. An exemplary control strategy for such on-demand torque control of a transfer case is described in commonly-owned U.S. Pat. No. 5,323,871, which is hereby incorporated by reference.

With continued reference to FIG. 2, rear planetary gearset 58 is shown to include a ring gear 110 that is non-rotationally fixed (i.e., such as to the housing a transfer case 20), a sun gear 112, and planet gears 114 meshed with sun gear 112 and ring gear 110. Planet gears 114 are rotatably supported on pins 116 that are fixed to a planet carrier 118. As seen, planet carrier 118 is fixed for rotation with quill shaft 84 while sun gear 112 is fixed for rotation with a rotor 120 of motor/generator 22. Thus, energization of stator 122 causes driven rotation of rotor 120 and sun gear 112 which results in rotation of planet carrier 118 at a reduced speed, such that planetary gearset 58 acts as a reduction gearset. While not intended to be limiting, it is contemplated that a preferred reduction ratio of about 3 to 1 is established by rear planetary gearset 58.

The hybrid drive system of the present invention includes two drive power sources, namely internal combustion engine 12 and motor/generator 22. Power from engine 12 is transmitted to transmission 14 which, in turn, is delivered to transfer case 20 via transmission output shaft 74. Transmission 14 can be of any known type (i.e., automatic, manual, automated manual, CVT) having a forward-reverse switching mechanism and a gearshift mechanism. Motor/generator 22 is connected to battery 26 and can be selectively placed in any of a DRIVE state, a CHARGING state, and a NO-LOAD state by controller 30. In the DRIVE state, motor/generator 22 functions as an electric motor which is driven by electric energy supplied from battery 26. In the CHARGING state, motor/generator 22 functions as an electric generator with regenerative braking (brake torque electrically generated by motor/generator 22) for storing electrical energy in battery 26. In the NO-LOAD state, the output (i.e., rotor 122) of motor/generator 22 is permitted to rotate freely.

Figure 3:
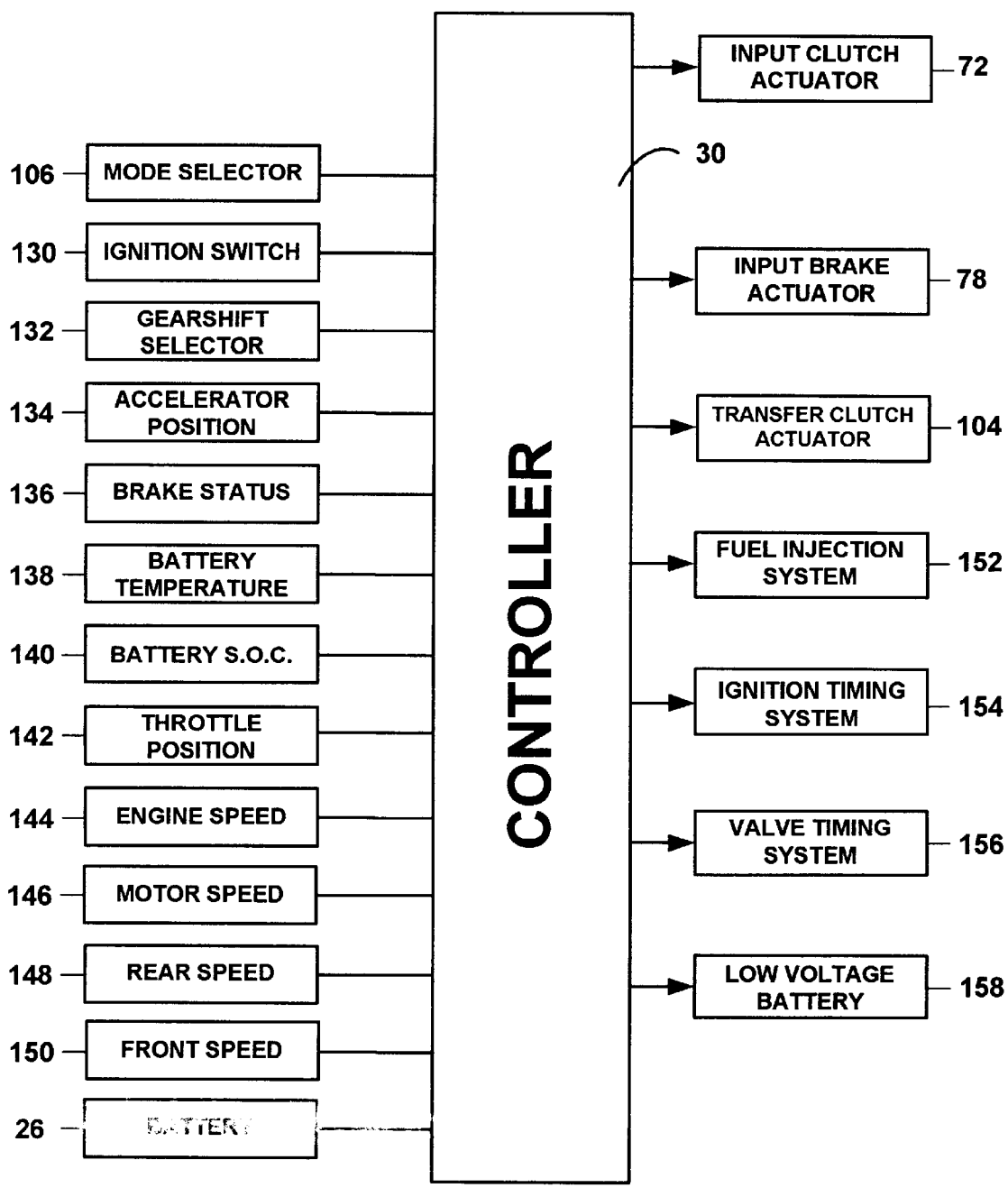
FIG. 3 is a schematic diagram showing the control system associated with the hybrid powertrain of FIGS. 1 and 2.

As noted, control system 24 is provided for controlling operation of the hybrid powertrain shown in FIGS. 1 and 2. Referring to FIG. 3, controller 30 is shown to receive input signals from various sensors and input devices previously identified cumulatively in FIG. 1 as vehicle sensors 28. Controller 30 is principally comprised of a microcomputer having a central processing unit (CPU), random-access memory (RAM), read-only memory (ROM), and an input-output actuator interface. Controller 30 performs data processing operations to execute various control routines according to control programs and/or maps stored in the ROM. Controller 30 receives data from an ignition switch 130, a gearshift lever switch 132, an accelerator position sensor 134, a brake status switch 136, a battery temperature sensor 138, a battery SOC (state of charge) sensor 140, and a throttle position sensor 142. In addition, other inputs include an engine speed sensor 144, a motor speed sensor 146, a rear shaft speed sensor 148, and a front shaft speed sensor 150. Ignition switch 130 is closed when the vehicle key is turned on. Assuming transmission 14 is of an automatic type, then "P", "N", "R", and "D" switches in gearshift selector switch 132 are closed when the gearshift mechanism is located in its Park (P), Neutral (N), Reverse (R) and Drive (D) positions, respectively. Accelerator position sensor 134 senses the depression angle of an accelerator pedal. Brake status switch 136 is turned on when the brake pedal is depressed. Battery temperature sensor 138 senses the temperature of battery 26. Battery SOC sensor 140 senses the charge level of battery 26. Throttle position sensor 142 senses the degree of opening of the engine throttle valve. Engine speed sensor 144 senses a parameter indicative of the rotary speed of the drive shaft of engine 12. Motor speed sensor 146 senses a parameter indicative of the rotary speed of rotor 120 of motor/generator 22. Rear speed sensor 148 senses the rotary speed of either rear output shaft 50 or rear propshaft 48 and can further be used as an indication of vehicle speed. Front speed sensor 150 senses the rotary speed of either front output shaft 40 or front prop shaft 38.

Based upon the operating information inputted to controller 30, a mode of operation of the hybrid powertrain is selected and controller 30 sends electric control signals to the various power-operated controlled devices. Specifically, controller 30 monitors and continuously controls actuation of motor/generator 22, clutch actuator 72 of input clutch 52, brake actuator 78 of input brake 54, and clutch actuator 104 of transfer clutch 62. Additionally, controller 30 monitors and controls various engine management systems for controlling the speed and torque generated by engine 12. These include a fuel injection system 152, an ignition timing system 154, and a valve timing system 156. A low voltage auxiliary battery 158 may serve as the power supply for controller 30.

There are four modes of operation for vehicle 10, namely: (a) an electric mode; (b) a hybrid; (c) an engine mode; and (d) a regenerative mode. In the electric mode, only motor 22 provides motive power to vehicle 10. In the hybrid mode, both engine 12 and motor 22 provide motive power to vehicle 10. In the engine mode, only engine 12 provides motive power to vehicle 10. In the regenerative mode, a portion of the engine power is absorbed by motor/generator 22 to charge battery 26. The transition from one mode to the next is smooth and transparent to the vehicle operator since controller 30 selects the most appropriate mode depending on various vehicle operating conditions including vehicle speed, accelerator demand and battery charge status.

Initially, with engine 12 stopped, input clutch 52 is released and brake 54 is engaged for braking clutch drum 64 and ring gear 80. Motor/generator 22 is then shifted into its DRIVE state such that electric power is supplied to motor/generator 22 for causing rotor 122 to drive sun gear 112 of rear planetary gearset 58 which, in turn, drives planet carrier 118 at a reduced speed ratio. Driven rotation of planet carrier 118 drives quill shaft 84 and sun gear 82 of front planetary gearset 56. Since ring gear 80 is braked, driven rotation of sun gear 82 drives pinion carrier 88 at a reduced ratio. While not intended to be limited thereto, it is contemplated that front planetary gearset 56 would establish a reduction ratio of about 5 to 1. Accordingly, the total reduction ratio from motor/generator 22 to pinion carrier 88 is about 15 to 1 which will supply approximately the same torque to the wheels as is generated by engine 12 and transmission 14. Pinion carrier 88 drives sprocket 90 for delivering power via transfer unit 60 to driven sprocket 92 and further drives hub 66 for delivering power to rear output shaft 50. During operation in the electric mode, it is contemplated that the vehicle may be driven up to about thirty miles per hour. This permits use of the electric mode in urban areas and stop and go driving so as to reduce the overall fuel consumption of vehicle 10.

When shifting from the electric mode into the hybrid mode, motor/generator 22 can be used to start engine 12 (assuming a manual transmission) by releasing brake 54, engaging input clutch 52 and increasing motor power. With engine 12 running, and input clutch 52 engaged, drive hub 66 is coupled for rotation with transmission shaft 74. Thus, in the hybrid mode, engine 12 and transmission 14 deliver power to a first input (ring gear 80) of front planetary gearset 56 while motor/generator 22 delivers power to a second input (sun gear 82) of front planetary gearset 56, thereby providing a full range of power capability. Controller 30 controls engine torque via real-time control of the various engine management systems in conjunction with controlling the motor torque developed by motor/generator 22. With input clutch 52 engaged, the drive ratio for the output (pinion carrier 88) of front planetary gearset 56 relative to transmission shaft 74 falls to unity while rear planetary gearset 58 still produces its reduction ratio. Under light throttle conditions, motor/generator 22 may be placed in its CHARGING state to recharge battery 26.

When operating conditions of vehicle 10 warrant operation in the engine only mode, the hybrid drive system is switched by simply shifting motor/generator 22 into its NO-LOAD state and maintaining input clutch 52 in its engaged state and input brake 54 in its released state. Additionally, motor/generator 22 can be shifted into its CHARGING state to provide regenerative braking. Finally, with vehicle 10 stopped, input clutch 52 engaged and brake 54 released, engine 12 drives front planetary gearset 56 and rear planetary gearset 58 to drive motor/generator 22 to provide auxiliary power or charge batter 26.

In any of the electric, hybrid an engine modes of operation, motive power is delivered to both rear output shaft 50 and driven sprocket 92. Based on the particular drive mode selected (i.e., 2WD, 4WD-LOCK, 4WD-AUTO), controller 30 controls the actuated condition of transfer clutch 62. As such, various two-wheel drive and four-wheel drive modes are available at all times. Thus, vehicle 10 combines the commercially-successful features of a traditional four-wheel drive drivetrain architecture (engine, transmission and transfer case) with hybrid power control to significantly advance the hybrid drive technology. Moreover, the present invention provided an arrangement for a hybrid four-wheel drive vehicle which is not highly customized, but rather permits "drop-in" assembly of a hybrid transfer case in place of a conventional transfer case. This arrangement also permits the use of a smaller internal combustion engine that is sized for cruise operation while the electric assist of the motor/generator is capable of driving the vehicle at low speeds.

A preferred embodiment of the invention has been disclosed to provide those skilled in the art an understanding of the best mode currently contemplated for the operation and construction of the four-wheel drive hybrid drive system. The invention being thus described, it will be obvious that various modifications can be made without departing from the true spirit and scope of the invention, and all such modifications as would be considered by those skilled in the art are intended to be included within the scope of the following claims.

What is claimed is:

1. A transfer case for use in a motor vehicle having an engine and first and second drivelines, comprising:

an input member adapted to be driven by the engine;

a first output shaft adapted to be connected to the first driveline;

a second output shaft adapted to be connected to the second driveline;

an input clutch operable in an engaged mode to rotatively couple said first output shaft to said input member and in a released mode to release said first output shaft from engagement with said input member;

an input brake operable in a released mode to permit rotation of said input member and in an engaged mode to brake said input member against rotation;

a planetary gearset having a sun gear, a ring gear fixed to said input member, and pinion gears meshed with said ring gear and said sun gear, said pinion gears are rotatably supported on a pinion carrier which is fixed to said first output shaft;

a transfer unit coupling said pinion carrier to said second output shaft; and an electric motor for selectively driving said sun gear.

2. The transfer case of claim 1 further comprising a control system for controlling actuation of said input clutch, said input brake and said electric motor to define an electric operating mode, a hybrid operating mode, and an engine operating mode.

3. The transfer case of claim 2 wherein said electric operating mode is established with said input clutch in its released mode, said input brake in its engaged mode and said electric motor actuated for driving said sun gear.

4. The transfer case of claim 2 wherein said hybrid operating mode is established with said input clutch in its engaged mode, said input brake in its released mode and said electric motor actuated for driving said sun gear.

5. The transfer case of claim 2 wherein said engine operating mode is established with said input clutch in its engaged mode, said input brake in its released mode and said electric motor turned off.

6. The transfer case of claim 1 further comprising a second planetary gearset having a second sun gear driven by said electric motor, a non-rotational second ring gear, and planet gears meshed with said second sun gear and second ring gear, said planet gears rotatably supported from a planet carrier which is fixed to said first sun gear.

7. The transfer case of claim 2 wherein said input clutch includes a clutch pack connected between said input member and said first output shaft, an apply plate, and a power-operated clutch operator which is controlled by said control system for selectively moving said apply plate to exert a clutch engagement force on said clutch pack for shifting said input clutch between its released and engaged modes.

8. The transfer case of claim 7 wherein said input brake includes a band brake located adjacent to said input member and a power-operated brake actuator which is controlled by said control system for selectively moving said band brake to exert a braking force on said input member for shifting said input brake between its released and engaged modes.

9. The transfer case of claim 8 wherein said control system includes a controller and sensors for detecting operating characteristics of the vehicle and sending sensor input signals to said controller, said controller operable to send control signals to said electric motor, said clutch actuator and said brake actuator.

10. The transfer case of claim 2 wherein said transfer unit includes a first sprocket driven by said pinion carrier, a second sprocket supported on said second output shaft, a power chain connecting said first and second sprockets, and a transfer clutch controlled by said control system and operable in a released mode to permit rotation of said second sprocket relative to said second output shaft and in an engaged mode to rotatively couple said second output shaft to said second sprocket.

11. The transfer case of claim 10 wherein said control system permits selection of a two-wheel drive mode, a part-time four-wheel drive mode and an automatic four-wheel drive mode, said two-wheel drive mode is established with said transfer clutch in its released mode, said part-time four-wheel drive mode is established with said transfer clutch in its engaged mode, and said automatic four-wheel drive mode is established with said transfer clutch varied between said engaged and released modes.

12. A transfer case for use in a motor vehicle having an engine and first and second drivelines, comprising:
an input member adapted to be driven by the engine;
a first output shaft adapted for connection to the first driveline;
a second output shaft adapted for connection to the second driveline;
an input clutch operable in an engaged mode to rotatively couple said first output shaft to said input member and in a released mode to release said first output shaft from engagement with said input member;
an input brake operable in a released mode to permit rotation of said input member and in an engaged mode to brake said input member against rotation;
a first planetary gearset having a first sun gear, a first ring gear fixed to said input member, and pinion gears meshed with said first ring gear and said first sun gear, said pinion gears are rotatably supported on a pinion carrier which is fixed to said first output shaft;
a second planetary gearset having a second sun gear, a second ring gear, and planet gears meshed with said second sun gear and said second ring gear, said planet gears are rotatably supported on a planet carrier which is fixed to said first sun gear;
a transfer unit coupling said pinion carrier to said second output shaft; and
an electric motor for selectively driving said second sun gear.

13. The transfer case of claim 12 further comprising a control system for controlling actuation of said input clutch, said input brake and said electric motor to define an electric operating mode, a hybrid operating mode, and an engine operating mode.

14. The transfer case of claim 13 wherein said electric operating mode is established with said input clutch in its released mode, said input brake in its engaged mode and said electric motor driving said sun gear.

15. The transfer case of claim 13 wherein said hybrid operating mode is established with said input clutch in its engaged mode, said input brake in its released mode and said electric motor driving said sun gear.

16. The transfer case of claim 13 wherein said engine operating mode is established with said input clutch in its engaged mode, said input brake in its released mode and said electric motor turned off.

17. The transfer case of claim 13 wherein said input member is a clutch drum and said input clutch includes a clutch pack connected between said clutch drum and said first output shaft, an apply plate, and a power-operated clutch operator which is controlled by said control system for selectively moving said apply plate to exert a clutch engagement force on said clutch pack for shifting said input clutch between its released and engaged modes.

18. The transfer case of claim 17 wherein said input brake includes a band brake adjacent to said clutch drum and a power-operated brake actuator which is controlled by said control system for selectively moving said band brake to exert a braking force on said clutch drum for shifting said input brake between its released and engaged modes.

19. The transfer case of claim 18 wherein said control system includes a controller and sensors for selecting operating characteristics of the vehicle and sending sensor input signals to said controller, said controller operable to send control signals to said electric motor, said clutch actuator and said brake actuator.

20. The transfer case of claim 13 wherein said transfer unit includes a first sprocket driven by said pinion carrier, a second sprocket supported on said second output shaft, a power chain connecting said first and second sprockets, and a transfer clutch controlled by said control system and operable in a released mode to permit rotation of said second sprocket relative to said second output shaft and in an engaged mode to rotatively couple said second output shaft to said second sprocket.

21. The transfer case of claim 20 wherein said control system permits selection of a two-wheel drive mode, a part-time four-wheel drive mode and an automatic four-wheel drive mode, said two-wheel drive mode is established with said transfer clutch in its released mode, said part-time four-wheel drive mode is established with said transfer clutch in its engaged mode, and said automatic four-wheel drive mode is established with said transfer clutch varied between said engaged and released modes.

22. A hybrid motor vehicle, comprising:
a powertrain including an internal combustion engine and a transmission;
a front driveline including a front differential connecting a pair of front wheels;
a rear driveline including a rear differential connecting a pair of rear wheels;
a transfer case including an input member driven by said powertrain, a front output shaft operably connected to said front differential, a rear output shaft operably connected to said rear differential, an input clutch operable in an engaged mode to rotatively couple said rear output shaft to said input member and in a released mode to release said rear output shaft from engagement with said input member, an input brake operable in a released mode to permit rotation of said input member and in an engaged mode to brake said input member against rotation, a planetary gearset having a sun gear, a ring gear fixed to said input member, and pinion gears meshed with said ring gear and said sun gear, said pinion gears are rotatably supported on a pinion carrier which is fixed to said rear output shaft, a transfer unit coupling said pinion carrier to said front output shaft, and an electric motor for selectively driving said sun gear; and
a control system for controlling actuation of said input clutch, said input brake and said electric motor to define an electric operating mode, a hybrid operating mode, and an engine operating mode.

23. The hybrid motor vehicle of claim 22 wherein said electric operating mode is established with said input clutch in its released mode, said input brake in its engaged mode and said electric motor actuated for driving said sun gear.

24. The hybrid motor vehicle of claim 22 wherein said hybrid operating mode is established with said input clutch in its engaged mode, said input brake in its released mode and said electric motor actuated for driving said sun gear.

25. The hybrid motor vehicle of claim 22 wherein said engine operating mode is established with said input clutch in its engaged mode, said input brake in its released mode and said electric motor turned off.

26. The hybrid motor vehicle of claim 22 further comprising a second planetary gearset having a second sun gear driven by said electric motor, a non-rotational second ring gear, and planet gears meshed with said second sun gear and second ring gear, said planet gears rotatably supported from a planet carrier which is fixed to said first sun gear.

27. The hybrid motor vehicle of claim 22 wherein said input clutch includes a clutch pack connected between said input member and said rear output shaft, an apply plate, and a power-operated clutch operator which is controlled by said control system for selectively moving said apply plate to exert a clutch engagement force on said clutch pack for shifting said input clutch between its released and engaged modes.

28. The hybrid motor vehicle of claim 27 wherein said input brake includes a band brake adjacent to said input member and a power-operated brake actuator which is controlled by said control system for selectively moving said band brake to exert a braking force on said input member for shifting said input brake between its released and engaged modes.

29. The hybrid motor vehicle of claim 28 wherein said control system includes a controller and sensors for selecting operating characteristics of the vehicle and sending sensor input signals to said controller, said controller operable to send control signals to said electric motor, said clutch actuator and said brake actuator.

30. The hybrid motor vehicle of claim 22 wherein said transfer unit includes a first sprocket driven by said pinion carrier, a second sprocket supported on said front output shaft, a power chain connecting said first and second sprockets, and a transfer clutch controlled by said control system and operable in a released mode to permit rotation of said second sprocket relative to said front output shaft and in an engaged mode to rotatively couple said front output shaft to said second sprocket.

31. The hybrid motor vehicle of claim 30 wherein said control system permits selection of a two-wheel drive mode, a part-time four-wheel drive mode is established with said transfer clutch in its engaged mode, and a automatic four-wheel drive mode is established with said transfer clutch varied between said engaged released modes.

32. A hybrid motor vehicle, comprising:
a powertrain including an internal combustion engine and a transmission;
a front driveline including a front differential connecting a pair of front wheels;
a rear driveline including a rear differential connecting a pair of rear wheels;
a transfer case including an input member driven by said powertrain, a front output shaft operably connected to said front differential, a rear output shaft operably connected to said rear differential, an input clutch operable in an engaged mode to rotatively couple said rear output shaft to said input member and in a released mode to release said rear output shaft from engagement with said input member, an input brake operable in a released mode to permit rotation of said input member and in an engaged mode to brake said input member against rotation, a first planetary gearset having a first sun gear, a first ring gear fixed to said input member, and pinion gears meshed with said first ring gear and said first sun gear, said pinion gears are rotatably supported on a pinion carrier which is fixed to said rear output shaft, a second planetary gearset having a second sun gear, a second ring gear, and planet gears meshed with said second sun gear and said second ring gear, said planet gears are rotatably supported on a planet carrier which is fixed to said first sun gear, a transfer unit coupling said pinion carrier to said front output shaft, and an electric motor for selectively driving said second sun gear; and
a control system for controlling actuation of said input clutch, said input brake and said electric motor to define an electric operating mode, a hybrid operating mode, and an engine operating mode.

33. The hybrid motor vehicle of claim 32 wherein said electric operating mode is established with said input clutch in its released mode, said input brake in its engaged mode and said electric motor driving said second sun gear.

34. The hybrid motor vehicle of claim 32 wherein said hybrid operating mode is established with said input clutch in its engaged mode, said input brake in its released mode and said electric motor driving said second sun gear.

35. The hybrid motor vehicle of claim 32 wherein said engine operating mode is established with said input clutch in its engaged mode, said input brake in its released mode and said electric motor turned off.

36. The hybrid motor vehicle of claim 32 wherein said input member is a clutch drum and said input clutch includes a clutch pack connected between said clutch drum and said rear output shaft, an apply plate, and a power-operated clutch operator which is controlled by said control system for selectively moving said apply plate to exert a clutch engagement force on said clutch pack for shifting said input clutch between its released and engaged modes.

37. The hybrid motor vehicle of claim 36 wherein said input brake includes a band brake adjacent to said clutch drum and a power-operated brake actuator which is controlled by said control system for selectively moving said band brake to exert a braking force on said clutch drum for shifting said input brake between its released and engaged modes.

38. The hybrid motor vehicle of claim 37 wherein said control system includes a controller and sensors for selecting operating characteristics of the vehicle and sending sensor input signals to said controller, said controller operable to send control signals to said electric motor, said clutch actuator and said brake actuator.

39. The hybrid motor vehicle of claim 32 wherein said transfer unit includes a first sprocket driven by said pinion carrier, a second sprocket supported on said front output shaft, a power chain connecting said first and second sprockets, and a transfer clutch controlled by said control system and operable in a released mode to permit rotation of said second sprocket relative to said front output shaft and in an engaged mode to rotatively couple said front output shaft to said second sprocket.

40. The hybrid motor vehicle of claim 39 wherein said control system permits selection of a two-wheel drive mode, a part-time four-wheel drive mode and an automatic four-wheel drive mode, said two-wheel drive mode is established with said transfer clutch in its released mode, said part-time four-wheel drive mode is established with said transfer clutch in its engaged mode, and said automatic four-wheel drive mode is established with said transfer clutch varied between said engaged and released modes.

* * * * *